June 26, 1962  J. W. WYRICK, JR  3,041,111
AUTOMATIC LOAD LEVELING SYSTEM FOR TRAILER DUMP TRUCK BEDS
Filed Aug. 3, 1960  4 Sheets-Sheet 1
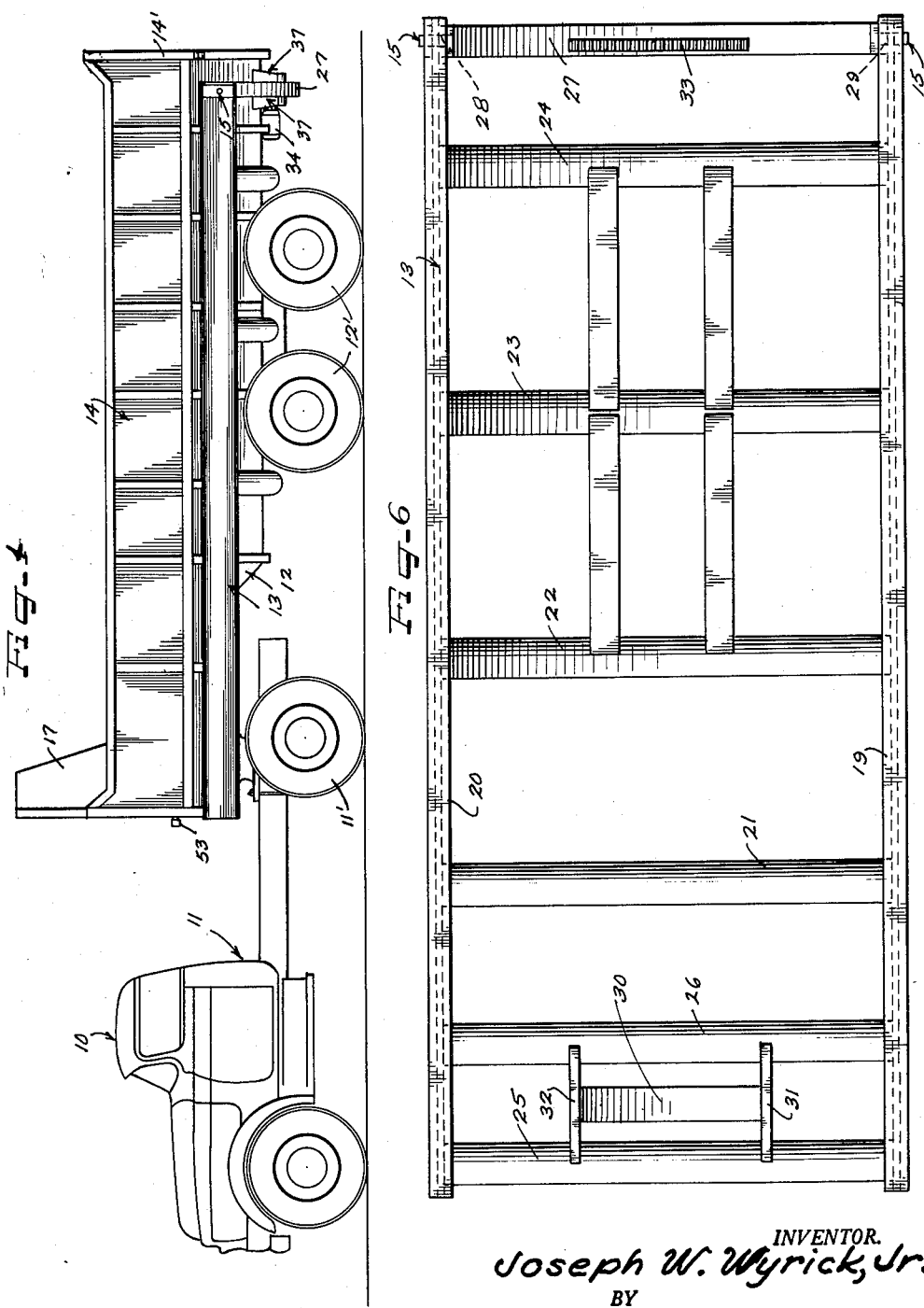
INVENTOR.
Joseph W. Wyrick, Jr.
BY
ATTORNEYS June 26, 1962     J. W. WYRICK, JR     3,041,111
AUTOMATIC LOAD LEVELING SYSTEM FOR TRAILER DUMP TRUCK BEDS
Filed Aug. 3, 1960     4 Sheets-Sheet 2
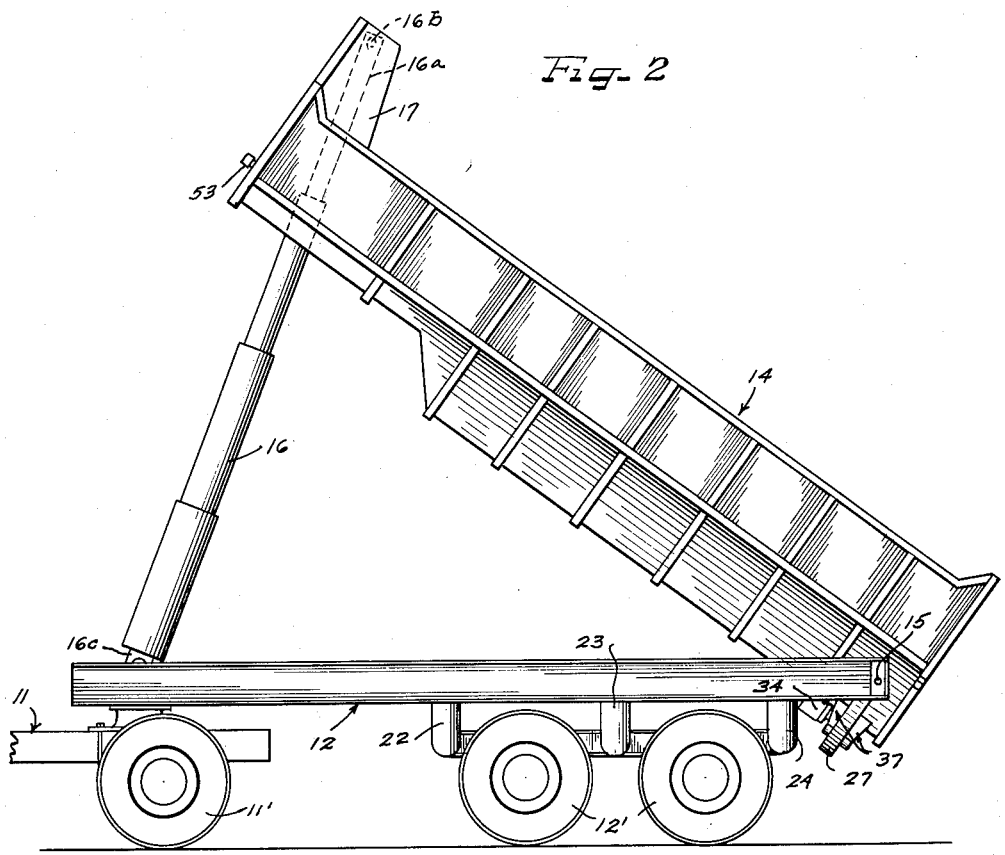
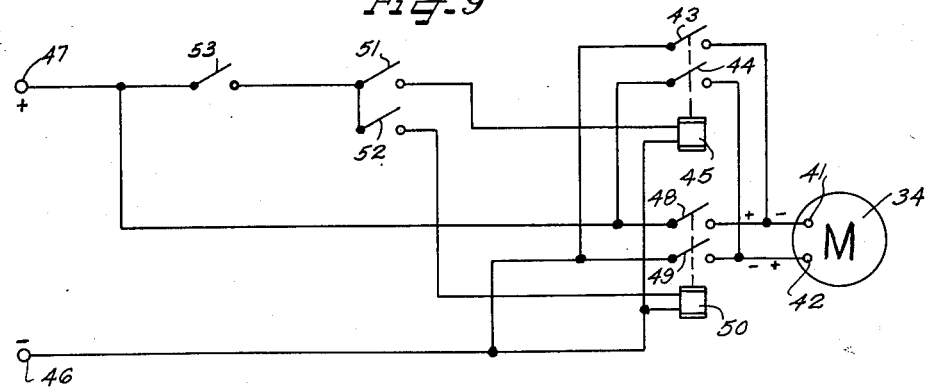
INVENTOR.
Joseph W. Wyrick, Jr.
BY
ATTORNEYS June 26, 1962     J. W. WYRICK, JR     3,041,111
AUTOMATIC LOAD LEVELING SYSTEM FOR TRAILER DUMP TRUCK BEDS
Filed Aug. 3, 1960     4 Sheets-Sheet 3
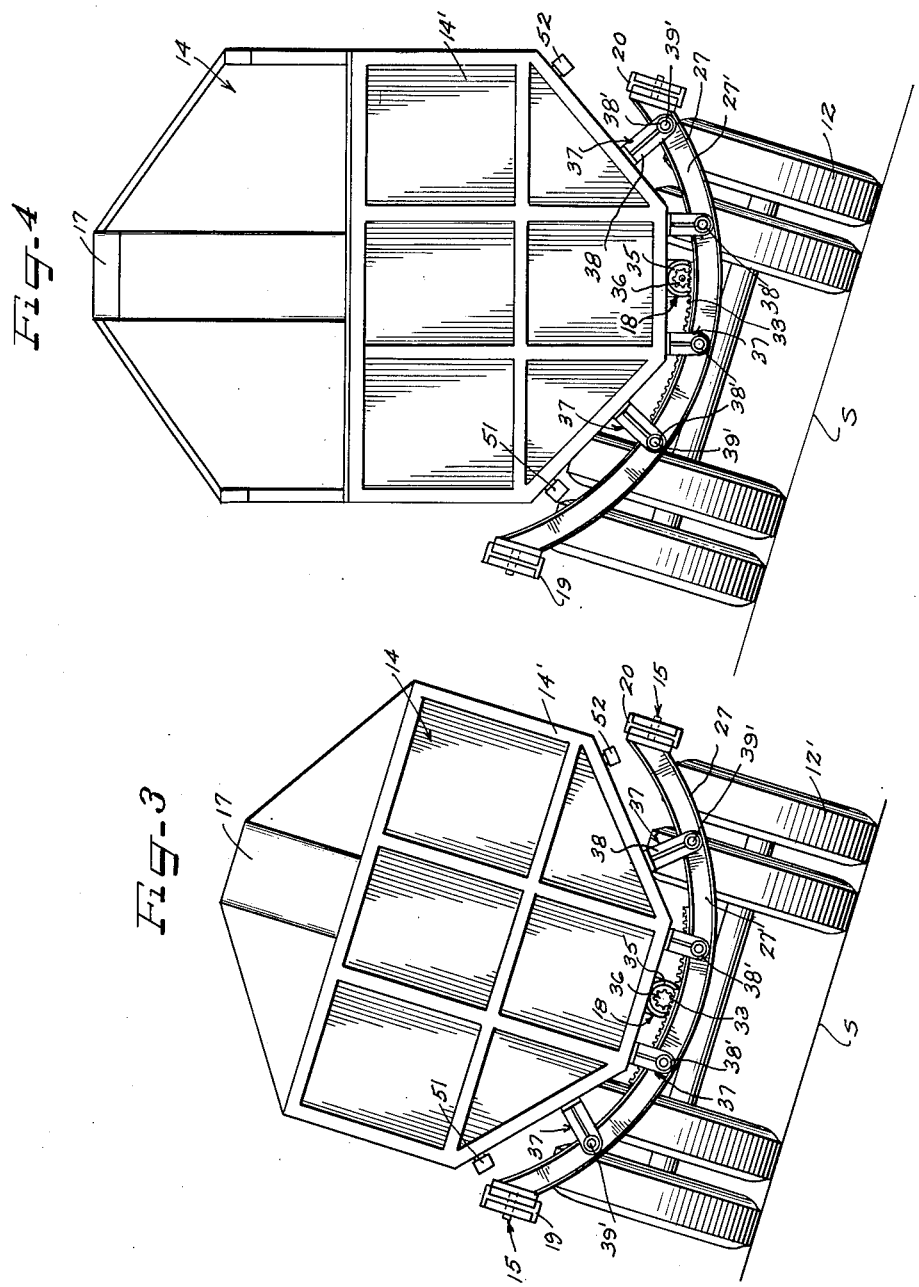
INVENTOR.
Joseph W. Wyrick, Jr.
BY
ATTORNEYS June 26, 1962  J. W. WYRICK, JR  3,041,111
AUTOMATIC LOAD LEVELING SYSTEM FOR TRAILER DUMP TRUCK BEDS
Filed Aug. 3, 1960  4 Sheets-Sheet 4
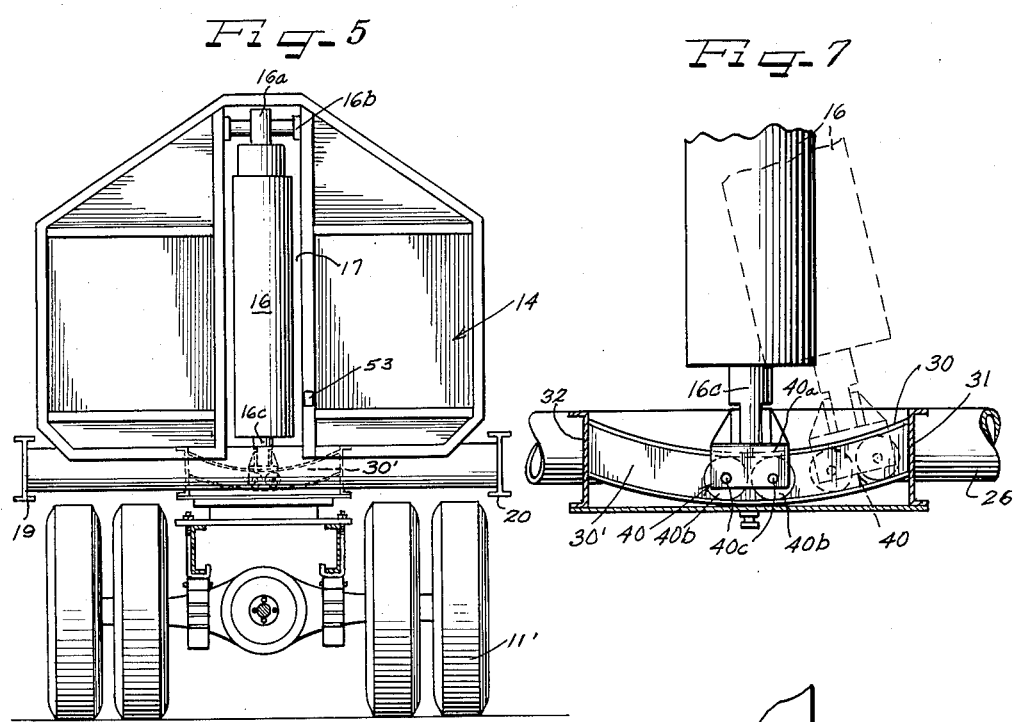
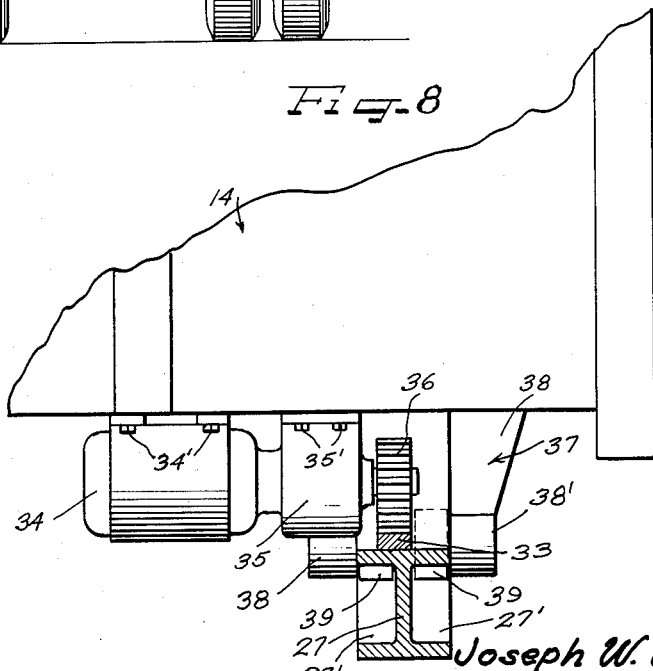
INVENTOR.
Joseph W. Wyrick, Jr.
ATTORNEYS 3,041,111
AUTOMATIC LOAD LEVELING SYSTEM FOR
TRAILER DUMP TRUCK BEDS
Joseph W. Wyrick, Jr., 1182 Stage Coach Road,
Little Rock, Ark.
Filed Aug. 3, 1960, Ser. No. 47,289
14 Claims. (Cl. 298—1)

The present invention relates generally to a load leveling device or mechanism for a dump truck and the like. The invention more particularly concerns a load leveling device or mechanism for shifting the dump to a generally level plane before the dump is unloaded.

The general purpose of the load leveling device is to enable a trailer dump truck operator to safely raise his loaded dump on terrain of elevations up to and including eighteen degrees and no known dump truck is capable of such performance.

When materials such as dirt are being hauled and are to be unloaded one of the main problems that confronts the truckers is that some unloading areas are not well suited for the unloading of the trucks. This is particularly true where the unloading area is on an inclined plane. Many times the truckers, in order to unload their trucks, are required to build up platforms of dirt or other materials for the rear end of the truck to be driven on the platform so that the contents of the truck may be unloaded from a relatively level position. It will be appreciated that where it is necessary to construct an unloading platform of this type that additional time is required to unload the trucks since it may be necessary to utilize other machinery in addition to the trucks to build the platform. Another drawback in having to build platforms of this type is that the material contained in the dump cannot be spread over as wide an inclined area in a road building operation when the truck is being unloaded due to the relatively small size of the platforms and it takes additional time for the material to be spread by spreaders than would ordinarily be required where the material could be unloaded while the truck is in forward motion.

According to the present invention, the truck has a built-in load leveling device or mechanism which enables the load contained in the dump to be moved in either transverse direction so that as the dump is elevated the dump may be unloaded from a generally level position. A truck having a load leveling mechanism of this type is vastly superior to former dump trucks for the materials in this new type of dump truck may be more readily spread over a large inclined area without the use of platforms and further since a considerable amount of time and expense may be avoided through the use of this new type of truck.

It is an important object of the present invention to provide a dump truck with a load leveling mechanism which enables the contents of the truck dump to be unloaded while the dump is disposed generally in a level plane even though the truck may be disposed on an inclined plane.

Still another object of the present invention is to provide a new and improved dump truck which enables materials to be unloaded from a dump onto an inclined surface without having to build a platform on the inclined surface for unloading the truck.

A further object is to provide a truck which may be unloaded while in motion on an inclined surface area without the use of unloading platforms thus saving considerable time and expense.

According to the general features of the present invention, there is provided a dump truck having a truck frame and a dump. The dump has a dump pivot which pivot is disposed generally at one end of the dump and joins the frame and the dump. The pivot enables the dump to be tilted relative to the frame for unloading the contents of the dump. Hydraulic lift means is provided for tilting the dump and is connected between the frame and the dump generally at another or forward end of the dump. Dump leveling means is provided for moving or rotating the dump from an inclined position to a generally level position while dumping when the truck is on an inclined surface. The means is connected between the dump and the frame and the dump as well as the hydraulic lift means are rotatable or movable relative to a longitudinal axis of the truck frame to enable the points of support and lift to always be maintained under the center of load while the dump is being loaded.

According to another feature of this invention, means is provided to permit the hoist to be maintained at right angles to the dump after the dump has been rotated to a level position when the truck is disposed on inclined terrain.

According to other features of the present invention, the hoist and the dump, at its rear end, are mounted on bearing means illustrated as rollers to facilitate transverse movement thereof during the dump leveling operation.

Other objects and features of the present inventions will more fully become apparent in view of the following detailed description taken in conjunction with the accompanying drawings illustrating therein a single embodiment, and in which:

FIGURE 1 is a side view of a dump truck;

FIGURE 2 is a fragmentary side view of a dump truck showing the dump in an elevated dumping position;

FIGURE 3 is a rear view of the dump truck shown in FIGURE 1 and which dump truck is disposed on an inclined surface;

FIGURE 4 is a rear view of the dump truck shown in FIGURE 3 only showing the dump in an elevated, rotated or leveled position;

FIGURE 5 is a front elevation of the trailer and the dump, with hitching portions shown in sections;

FIGURE 6 is a top plan view of the truck frame;

FIGURE 7 is an enlarged fragmentary partially sectioned view showing the manner in which the hoist cooperates with the frame, with the hoist being shown in full and dotted line to illustrate the transverse movement of the hoist;

FIGURE 8 is a fragmentary enlarged side elevation of a portion of the dump, with a portion of the frame shown in section, and highlighting the mechanism for transversely moving the dump; and FIGURE 9 is an electrical circuit diagram of the load leveling mechanism.

As shown on the drawings:

The reference numeral 10 indicates generally a dump truck of more or less conventional type. This truck 10 includes a tractor 11 carried on wheels 11′ as well as a trailer 12 which is carried on a series of longitudinally spaced sets of wheels 12′.

Before proceeding with a detailed description of the dump truck 10, a brief general description of the dump truck 10 is now given for orientation purposes. The trailer 12 is provided with a truck frame 13 and a dump 14 is carried on the truck frame 13. This dump 14 has a dump door 14′ and the dump is connected to the truck frame 13 by means of a dump pivot 15 disposed at a rear end of the trailer and by means of a single cylinder hoist 16 disposed at a forward end of the trailer 12 and which hoist, as illustrated, is comprised of a series of telescoping sections, the uppermost cylinder or hoist section being identified at 16a and being pivotally connected at 16b to the dump 14 in a dump recessed area 17 (FIGURE 2). In order to insure close cooperation between the hoist 16 and the dump 14, the hoist 16 is housed within the dump recessed area 17 (FIGURE 5).

To permit the dump to be disposed in a generally level position when the truck is disposed on an inclined surface, the trailer 12 is provided with a dump leveling mechanism 18 (FIGURES 3 and 4) according to certain features of the present invention. As the hoist is elevated to raise a front end of the dump 14, if the dump is not disposed in a level plane, the dump leveling mechanism 18 serves to move or rotate the dump 14 relative to a longitudinal axis of the trailer until the dump is disposed in a relatively level plane.

The truck frame 13 may be supported on the trailer 12 in any conventional manner. The truck frame includes a pair of longitudinal side frame I beams 19 and 20 as well as a series of longitudinally spaced curved frame cross beams 21, 22, 23 and 24. Disposed at the front end of the truck frame are a pair of longitudinally spaced frame cross beams 25 and 26. The beams 21, 22, 23, 24, 25 and 26 are all joined with the longitudinal side frame beams 19 and 20 and together comprise the truck frame 13. Disposed at a rear end of the truck frame 13 is a transverse arcuate cradle 27. This cradle is secured to the side frame beams 19 and 20 by pivot pins 28 and 29 at the pivots 15, 15 so that the cradle may rock transversely relative to the side frame beams 19 and 20.

In accordance with the present invention, the frame 13 further includes a curved or arcuate I beam 30 which is secured to the cross beams 25 and 26 by means of a pair of transversely spaced channels 31 and 32. This beam 30 defines an arcuate hoist roller guideway 30' and is adapted to coact with the hoist 16 in a manner which will be hereafter described in further detail. Mounted at the rear end of the frame 13 on the cradle 27 is an arcuate rack 33 which is a component of the load leveling mechanism that will also be hereafter described in further detail.

The load leveling mechanism further includes a motor 34 which is bolted at 34', 34' to the underside of the dump 14 (FIGURE 8). Connected to the motor is a speed reducer 35 which is bolted at 35', 35' to the dump 14 as well as a pinion gear 36 which is engaged with the rack 33 so that as the gear is rotated, the dump will move or rotate along the transverse extent of the rack 33.

The rear end of the dump has bearings illustrated as a series of roller assemblies 37 secured thereto. Each of the roller assemblies 37 includes a roller bracket 38 which is secured to the bottom of the dump 14. Disposed at a lower end of the brackets 38 are bearings 38' and rollers 39 having roller shafts 39' secured in the bearings 38'. The rollers 39 are carried within cradle channels defining roller guideways 27' defined by the cradle 27 so that the rear end of the dump 14 is supported on the cradle 27 by means of the rollers 39 and the cradle 27 is in turn pivotally connected to the side frame beam 19 and 20. The channels 27' are on opposite sides of the I beam cradle 27 as are the rollers 39 so the rollers are engaged in both of the cradle channels 27'. This structure permits the dump 14 to be not only longitudinally pivoted at its rear end but it also permits the dump to be transversely rocked or rolled through an arc at its rear end to level the dump as it is being unloaded.

In order to facilitate the transverse movement of the dump 14, the hoist 16 is also transversely movable contemporaneously with the movement of the dump 14 on the rack 33. To attain this end, bearings comprising a hoist roller assembly 40 is attached to a lower end of a hoist projection 16c. The hoist roller assembly 40 includes a hoist roller bracket 40a and a pair of hoist rollers 40b, 40b which are supported on the bracket 40a by means of a pair of hoist pins 40c, 40c (FIGURE 7). The hoist rollers 40b, 40b are engaged in the arcuate hoist roller guideway 30' enabling the hoist rollers 40b, 40b and the hoist to move transversely with the dump as the dump rollers 39 are moved along the arcuate roller guideway 40. As illustrated, the arcuate guideways 27' and 30' and the arcuate rack 33 are all concentric with one another.

FIGURE 10 is an electrical circuit diagram showing the connections for energizing the motor 34 of the dump leveling mechanism 18. The motor 34 is a D.C. motor having terminals 41 and 42. Terminals 41 and 42 are connected through contacts 43 and 44 of a contactor 45 to terminals 46 and 47 which are connected to the battery of the truck 10 or to any other suitable source. Terminals 41 and 42 of the motor 34 are also connected through terminals 48 and 49 of a contactor 50 to the supply terminals 46 and 47. Terminals of the contactors 45 and 50 are connected to the supply terminal 46. The other terminals thereof are connected to limit switches 51 and 52 and through a control switch 53 to the supply terminal 47.

In operation, the limit switch end is closed when it is desired to unload the dump 14. If the dump 14 is then level, both of the limit switches 51 and 52 will be opened and nothing will happen. However, if the truck trailer 12 and the dump 14 are tilted in one direction, the limit switch 51 will be closed, to energize the contactor 45 and close the contacts 43 and 44 thereof. The motor 34 will then be energized to rotate in one direction, terminals 41 and 42 thereof being respectively connected to the terminals 46 and 47. When the dump 14 then reaches a level position, the limit switch 51 will open and no further transverse rotation of the dump 14 will take place. If the dump 14 is tilted in the transversely opposite direction, the limit switch 52 is closed to energize the contactor 50 and close the contacts 48 and 49 thereof, to energize the motor 34 in the reverse direction. The motor 34 will then rotate in the reverse direction until the dump 14 is brought to a level condition, when the limit switch 52 will then open.

In summary, when the truck 10 is driven on an inclined surface S (FIGURES 4 and 5) the operator will actuate hoist control (not shown) causing the dump 14 to be elevated at its forward end and pivoted on the dump pivots 15 at its rear end. One of the limit switches 51 or 52 will be closed depending on which way the truck is inclined and the dump 14 will be automatically leveled with the dump 14 and the hoist 16 moving transversely on the respective rollers 39 and 40b. When the dump is leveled, the limit switches will be open as described above.

It will be understood that modifications and variations may be effected without departing from the scope of the novel concepts of the present invention.

I claim as my invention:

1. A dump truck having a truck frame, a dump and a dump pivot which pivot is disposed generally at one end of the dump joining said truck frame and said dump and which pivot enables the dump to be tilted for unloading the contents of the dump, a hoist for tilting the dump connected between the frame and the dump generally at another end of the dump, and dump leveling means for rotating the dump and the hoist from an inclined position to a generally level position while dumping when the truck is on an inclined plane, said dump leveling means including bearings between the hoist and the frame permitting the hoist to rotate transversely of the frame contemporaneously with the transverse movement of said dump relative to said frame.

2. A dump truck having a truck frame, a dump carried on a cradle, the cradle being pivotally mounted on said frame at a rear end of the dump and which pivot enables the dump to be tilted for unloading the contents of the dump, lift means for tilting the dump on the pivot connected between the frame and the dump generally at another end of the dump, and dump leveling means for rotating the dump and the lift means from an inclined position to a generally level position while dumping when the truck is on an inclined plane, said dump leveling means being connected between the dump and the cradle and with the dump as well as said lift means being rotatable in a transverse plane relative to a longitudinal axis of said truck frame.

3. A dump truck having a truck frame, a dump carried on a cradle, the cradle being pivotally mounted on said frame at a rear end of the dump and which pivot enables the dump to be tilted for unloading the contents of the dump, lift means for tilting the dump on the pivot connected between the frame and the dump generally at another end of the dump, and dump leveling means for rotating the dump and the lift means from an inclined position to a generally level position while dumping when the truck is on an inclined plane, said dump leveling means being connected between the dump and the cradle, said dump leveling means including a rack mounted on said cradle and a pinion gear carried by said dump in mesh with said rack for transverse movement of the dump.

4. A dump truck having a truck frame, a dump carried on a cradle, the cradle being pivotally mounted on said frame at a rear end of the dump and which pivot enables the dump to be tilted for unloading the contents of the dump, lift means for tilting the dump on the pivot connected between the frame and the dump generally at another end of the dump, and dump leveling means for rotating the dump and the lift means from an inclined position to a generally level position while dumping when the truck is on an inclined plane, said dump leveling means being connected between the dump and the cradle, said dump leveling means including a rack mounted on said cradle and a pinion gear carried by said dump in mesh with said rack for transverse movement of the dump, said dump leveling means further including bearings between said lift means and the frame permitting the lift means to move transversely of the frame contemporaneous with the transverse movement of said pinion gear on said rack.

5. A dump truck having a truck frame, a dump carried on a cradle, the cradle being pivotally mounted on said frame at a rear end of the dump and which pivot enables the dump to be tilted for unloading the contents of the dump, lift means for tilting the dump on the pivot connected between the frame and the dump generally at another end of the dump, and dump leveling means for rotating the dump and the lift means from an inclined position to a generally level position while dumping when the truck is on an inclined plane, said dump leveling means being connected between the dump and the cradle, said dump leveling means including a rack mounted on said cradle and a pinion gear carried by said dump in mesh with said rack for transverse movement of the dump, said dump leveling means further including bearings between said lift means and the frame permitting the lift means to move transversely of the frame contemporaneous with the transverse movement of said pinion gear on said rack, said rack being arcuate and said rollers being mounted on an arcuate roller guideway with the arc of the rack being concentric with the arc of said roller guideway enabling the lift means and the dump to move through concentric arcs.

6. A dump truck having a truck frame, a dump and a dump pivot which pivot is disposed generally at one end of the dump joining said frame and said dump and which pivot enables the dump to be tilted for unloading the contents of the dump, lift means for tilting the dump connected between the frame and the dump generally at another end of the dump, and dump leveling means being connected between the dump and the frame for rotating the dump from an inclined position to a generally level position while dumping when the truck is on an inclined plane, the dump leveling means including a reversible motor, and a pinion gear driven by the reversible motor, the gear being in mesh with a transversely extending rack carried on said dump, the dump leveling means further including a pair of mercury switches disposed on opposite sides of the dump and connected with the reversible motor so that if the dump is inclined to one side the mercury switch on that side will function to close the circuit and to cause the motor to drive the pinion gear until the dump is level at which time the mercury switch opens, and with the other mercury switch being operable in a like manner only to drive the pinion gear in an opposite direction to level the dump.

7. A dump truck having a truck frame, a dump carried on a cradle, the cradle being pivotally mounted on said frame at a rear end of the dump and which pivot enables the dump to be tilted for unloading the contents of the dump, a hoist for tilting the dump on the pivot connected between the frame and the dump generally at another end of the dump, and dump leveling means for moving the dump and the lift means from an inclined position to a generally level position while dumping when the truck is on an inclined plane, said dump leveling means being connected between the dump and the cradle, said hoist having a lower hoist end and a hoist roller secured to said end, the frame having a transverse hoist roller guideway with said hoist roller therein thus permitting the hoist to move transversely of the frame as the dump is moved from an inclined position to a generally level position by said dump leveling means.

8. The truck of claim 7 further characterized by bearings being disposed between the cradle and the dump to facilitate rotary movement of said dump by the operation of the load leveling means, the cradle and the transverse hoist roller guideway comprising concentric arcs so the dump and the hoist may be readily moved transversely of the frame.

9. The truck of claim 7 further characterized by the cradle having oppositely facing cradle roller guideways and with the dump having rollers disposed on opposite sides of said cradle in said cradle roller guideways to facilitate transverse movement of the dump.

10. A dump truck having a truck frame, a dump carried on a cradle, the cradle being pivotally mounted on said frame at a rear end of the dump and which pivot enables the dump to be tilted for unloading the contents of the dump, a hoist for tilting the dump on the pivot connected between the frame and the dump generally at another end of the dump, and dump leveling means for moving the dump and the lift means from an inclined position to a generally level position while dumping when the truck is on an inclined plane, the hoist having a leveling means control switch which is normally open but closable upon the movement of the hoist, the dump leveling means including a reversible motor in circuit with said control switch, and a pinion gear driven by the reversible motor, the gear being in mesh with a transversely extending rack carried on said dump, the dump leveling means further including a pair of mercury switches disposed on opposite sides of the dump and in circuit with the reversible motor so that if the dump is inclined to one side the mercury switch on that side will function to close the circuit and to cause the motor to drive the pinion gear along the rack until the dump is level at which time the mercury switch opens, and with the other mercury switch being operable in a like manner only to drive the pinion gear in an opposite direction along the rack to level the dump when the dump is inclined in an opposite direction.

11. A dump truck having a truck frame, a dump and a dump pivot which pivot is disposed generally at one end of the dump joining said frame and said dump and which pivot enables the dump to be tilted for unloading the contents of the dump, a hoist for tilting the dump connected between the frame and the dump generally at another end of the dump, and dump leveling means enabling the loaded dump to be safely raised on an inclined elevation, the hoist having a leveling means control switch which is normally open but closable upon the movement of the hoist, the dump leveling means including a reversible motor in circuit with said control switch, and a pinion gear driven by the reversible motor, the gear being in mesh with a transversely extending rack carried on said dump, the dump leveling means further including a pair of mercury switches disposed on opposite sides of the dump and in circuit with the reversible motor so that if the dump is inclined to one side the mercury switch on that side will function to close the circuit and to cause the motor to drive the pinion gear along the rack until the dump is level at which time the mercury switch opens, and with the other mercury switch being operable in a like manner only to drive the pinion gear in an opposite direction along the rack to level the dump when the dump is inclined in an opposite direction.

12. A dump truck having a truck frame, a dump and a dump pivot joining said frame and said dump and which pivot enables the dump to be tilted for unloading the contents of the dump, lift means for tilting the dump connected between the frame and the dump generally at another end of the dump, and dump leveling means being connected between the dump and the frame for rotating the dump from an inclined position to a generally level position when the truck is on an inclined plane, the dump leveling means including a reversible motor, the dump leveling means further including a pair of switches disposed on opposite sides of the dump and connected with the reversible motor so that if the dump is inclined to one side, said dump leveling means and the switch on that side will function to close the motor circuit and cause the dump to be rotated in one direction until leveled through the operation of said dump leveling means at which time the switch opens, and with said dump leveling means and the other switch being operable in a like manner only to cause the reversible motor to be reversed with the dump being rotated in an opposite direction to level the dump through the operation of said dump leveling means.

13. A dump leveling means for connection between a dump and a frame for rotating a dump from an inclined position to a generally level position when a truck is on an inclined plane, the dump leveling means including a reversible motor, and a pinion gear driven by the reversible motor, the gear being in mesh with a transversely extending rack for disposition on a dump, the dump leveling means further including a pair of switches for disposition on opposite sides of a dump and connected with the reversible motor so that if a dump is inclined to one side said dump leveling means and the switch on that side will function to close the circuit and to cause the motor to drive the pinion gear on the rack until the dump is level at which time the switch opens, and with said dump leveling means and the other switch being operable in a like manner only to drive the pinion gear in an opposite direction on the rack to level a dump.

14. Dump leveling means for enabling a loaded dump to be safely raised on an inclined elevation, a leveling means control switch for a truck hoist which switch is normally open but closable upon the movement of a truck hoist, the dump leveling means including a reversible motor in circuit with said control switch, and a pinion gear driven by the reversible motor, the gear being in mesh with a rack for transverse disposition on a dump, the dump leveling means further including a pair of switches for disposition on opposite sides of a dump and in circuit with the reversible motor so that if a dump is inclined to one side said dump leveling means and one of said switches will function to close the circuit and cause the motor to drive the pinion gear along the rack until a dump is level at which time the closed switch opens, and said dump leveling means and another of said switches being operable in a like manner only to drive the pinion gear in an opposite direction along the rack to level a dump when a dump is inclined in an opposite direction.

References Cited in the file of this patent

UNITED STATES PATENTS 2,556,610    Biszantz _____ June 12, 1951